(12) United States Patent
Pivazyan (10) Patent No.: US 10,808,295 B2
(45) Date of Patent: Oct. 20, 2020

(54) METHOD FOR LEACHING PRECIOUS METALS CONTAINING ORES USING THIOSULFATE COMPOUNDS AND ALKALINE EARTH METALS HYDROXIDES

(71) Applicant: Arman Pivazyan, Woodbridge, CT (US)

(72) Inventor: Arman Pivazyan, Woodbridge, CT (US)

( * ) Notice: Subject to any disclaimer, the term of this patent is extended or adjusted under 35 U.S.C. 154(b) by 0 days.

(21) Appl. No.: 16/315,072

(22) PCT Filed: Jul. 5, 2017

(86) PCT No.: PCT/US2017/040710
§ 371 (c)(1),
(2) Date: Jan. 3, 2019

(87) PCT Pub. No.: WO2018/009536
PCT Pub. Date: Jan. 11, 2018

(65) Prior Publication Data
US 2019/0241991 A1  Aug. 8, 2019

Related U.S. Application Data

(60) Provisional application No. 62/366,197, filed on Jul. 25, 2016, provisional application No. 62/358,514, filed on Jul. 5, 2016.

(51) Int. Cl.
*C22B 3/00* (2006.01)
*C22B 3/12* (2006.01)
*C22B 3/14* (2006.01)

(52) U.S. Cl.
CPC ............... *C22B 11/04* (2013.01); *C22B 3/12* (2013.01); *C22B 3/14* (2013.01); *Y02P 10/20* (2015.11)

(58) Field of Classification Search
None
See application file for complete search history.

(56) References Cited

U.S. PATENT DOCUMENTS

| | | | |
|---|---|---|---|
| 4,384,889 A | 5/1983 | Wiewiorowski | |
| 2004/0115108 A1 | 6/2004 | Hackl | |
| 2004/0237721 A1* | 12/2004 | Baghalha | C22B 3/04 75/744 |
| 2012/0125818 A1 | 5/2012 | O'Rear | |

FOREIGN PATENT DOCUMENTS

GB  2427400 B  5/2007

* cited by examiner

*Primary Examiner* — Melissa S Swain
(74) *Attorney, Agent, or Firm* — Cantor Colburn LLP (57) ABSTRACT

Methods, systems and lixiviation compositions including an ammonium thiosulfate or a non-ammonium thiosulfate component in combination with one or more alkaline earth metal hydroxides, and optionally copper cations, for leaching precious metals from a precious metal containing material. The alkaline earth metal hydroxides may include magnesium hydroxide, calcium hydroxide, or a combination of magnesium hydroxide and calcium hydroxide.

39 Claims, 4 Drawing Sheets

METHOD FOR LEACHING PRECIOUS METALS CONTAINING ORES USING THIOSULFATE COMPOUNDS AND ALKALINE EARTH METALS HYDROXIDES

PRIORITY

This application claims priority to U.S. Provisional Application No. 62/358,514, filed Jul. 5, 2016, and priority to U.S. Provisional Application No. 62/366,197, filed Jul. 25, 2016.

TECHNICAL FIELD

The present invention is directed to leaching precious metals, and in particular, to improving the process of leaching precious metals, including gold, from gold bearing ores and other gold bearing materials, by using thiosulfate based leaching solutions, with or without copper cations, in combination with alkaline earth metals hydroxides.

BACKGROUND ART

The process of separating a soluble substance from one that is insoluble, by washing or percolation with a solvent, is referred to as lixiviation. Extraction of precious metals by lixiviation usually is performed using leaching solutions containing cyanide. However, cyanide is an extremely toxic substance, and the processing thereof is a substantial threat to human health and the environment. Both health and environmental risks of using cyanide are so high, that in many countries have prohibited use of cyanide in lixiviation. In addition, cyanide lixiviation is not suitable for all types of precious metal containing ores.

Due to several drawbacks associated with the use of cyanide, alternate approaches have been introduced over the years for extracting precious metals by lixiviation. One such process is the use of non-toxic thiosulfates for leaching precious metals containing ores and other precious metal bearing materials. Thiosulfate is a low toxicity compound, such that, both environmental and human health risks are substantially lower as compared to those associated with cyanide.

In known thiosulfate lixiviation processes, thiosulfate salts, including ammonium thiosulfate, or non-ammonium thiosulfates, such as, calcium thiosulfate, sodium thiosulfate, potassium thiosulfate, have been used alone or in combination with ammonium hydroxide and/or copper cations. While such lixiviation processes avoid the use of toxic cyanide, such known thiosulfate lixiviation processes have various other drawbacks, such us high cost, low precious metals dissolution rate, thiosulfate degradation, as well as difficultly in recycling barren solution which further increases processing costs. It is also hard to extract metals (e.g., gold) from the pregnant leach solution (i.e., the solution containing dissolved extractable mineral that was leached from the ore) using such known thiosulfate lixiviation processes due to formation of polythionates that are known to interfere with recovery of precious metals from pregnant solution by ion-exchange resins.

While thiosulfates without added ammonium hydroxide, with or without copper, tend to be lower in cost, are more stable, and have decreased toxicity and volatility than that associated with thiosulfates used in combination with ammonium hydroxide, they provide a very low rate of gold dissolution rendering it difficult to leach precious metals. Elevated temperatures and increased air pressure or pure oxygen are often needed to accelerate the dissolution rate for thiosulfates without ammonium hydroxide.

As a result of low gold dissolution rates of ammonium and non-ammonium thiosulfates alone, ammonium hydroxide and copper salts providing copper cations are used in combination with thiosulfates to increase such gold dissolution rates. Oxygenation of these leaching solutions by open-air stirring, leaching in pressurized air, or pure oxygen environment further assists in the lixiviation process. However, ammonia is a volatile substance that is released during leaching in open environments which decreases the concentration of ammonium hydroxide required for leaching and could pose a health and environmental threat. Ammonium hydroxide is also costly, and when used in high concentrations as required in thiosulfate leaching, increases costs to the lixiviation process. The use of copper cations in these solutions results in the key working ingredient tetraaminecopper, which besides accelerating precious metals dissolution also causes rapid degradation of thiosulfate. As such, known ammonium hydroxide based thiosulfates lixiviation processes release toxic ammonia vapors, have increased costs due to higher concentrations of ammonium hydroxide and thiosulfates required for efficient leaching, as well as promote rapid degradation of thiosulfates, making these compositions not suitable for most commercial applications. Furthermore, products of thiosulfate degradation, polythionates, interfere with some known processes of recovering gold from pregnant solution (such as "resin in leach", "resin in pulp"), and need to be chemically regenerated back to thiosulfate before recovering gold.

Therefore, modifications to thiosulfate leaching processes are required that will lower the processing costs, increase stability of the leaching solution, and increase rates of precious metals dissolution. By increasing the rates of precious metals dissolution the concentrations of required active leaching solution constituents would be decreased, which in turn, leads to lowering overall costs. Thiosulfate leaching processes and solutions based both on ammonium and non-ammonium thiosulfates having the foregoing benefits would be highly beneficial to the mining industry.

DISCLOSURE OF INVENTION

Bearing in mind the problems and deficiencies of the prior art, it is therefore an object of the present invention to provide improved methods, compositions and systems of extracting precious metals by lixiviation.

Another object of the invention is to provide improved lixiviation methods, compositions and systems having lower processing costs, providing higher rates of precious metals dissolution, increasing yields of precious metals, and in particular, higher rates of gold dissolution and increases yield of gold.

Still another object of the invention is to provide improved lixiviation methods and systems having chemical constituents that remain more stable in the leaching solution during the lixiviation process.

Another object of the invention is to provide improved lixiviation methods and systems for gold leaching from precious metal containing ores and other precious metal containing materials using thiosulfate containing solutions.

Still other objects and advantages of the invention will in part be obvious and will in part be apparent from the specification.

The above and other objects, which will be apparent to those skilled in the art, are achieved in the present invention which is directed to methods, systems and compositions for extracting precious metals from a precious metals bearing material. The various methods of the invention include providing a precious metal containing material and one of the lixiviating solutions of the invention. The lixiviating solutions of the invention include thiosulfate component in combination with one or more alkaline earth metal hydroxides, and optionally copper cations. The precious metal containing material is provided into the instant lixiviating solution, and the leaching process is performed to render a pregnant solution containing the leached precious metal. The leached precious metal is then recovered from the pregnant solution by one of the preexisting processes.

In accordance with the various embodiments of the invention, the thiosulfate component may be an ammonium thiosulfate or a non-ammonium thiosulfate. The non-ammonium thiosulfate may include, but is not limited to, sodium thiosulfate, potassium thiosulfate, magnesium thiosulfate, calcium thiosulfate, and the like. The one or more alkaline earth metal hydroxides are combined with the ammonium thiosulfate or the non-ammonium thiosulfate, and may include magnesium hydroxide, calcium hydroxide, or a combination of magnesium hydroxide and calcium hydroxide. Yet, in other preferred embodiments lixiviation solution includes magnesium thiosulfate or a combination of magnesium thiosulfate and other non-ammonium thiosulfates combined with ammonium hydroxide, creating in situ thiosulfate component(s) combined with alkaline earth metal hydroxide. In one or more preferred embodiments, these various lixiviating solutions of the invention also include copper cations provided in solution by addition of water soluble salts of copper. Numerous different combinations of the foregoing constituents, in various molar concentrations, may be combined to formulate the lixiviating solutions of the invention. The instant lixiviating solutions are particularly useful for leaching gold from gold containing materials.

Embodiments of the invention are also directed to thiosulfate lixiviation compositions that include a thiosulfate component in combination with one or more alkaline metal hydroxides in solution, or a solution that creates thiosulfate component in combination with alkaline earth metal hydroxide, and optionally copper cations. The thiosulfate component may be an ammonium thiosulfate or a non-ammonium thiosulfate, in combination with one or more alkaline earth metal hydroxides including magnesium hydroxide, calcium hydroxide, and a combination of magnesium hydroxide and calcium hydroxide. The non-ammonium thiosulfate may be sodium thiosulfate, potassium thiosulfate, magnesium thiosulfate, calcium thiosulfate, and combinations thereof. The copper cations may be included as copper sulfate, copper chloride, copper acetate or other water soluble divalent copper salts in the solution. Various combinations of the foregoing chemical constituents may be combined in different molar concentrations to provide one or more lixiviation solutions of the invention, which are suitable for leaching precious metals from a precious metal containing material.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

MODES FOR CARRYING OUT THE INVENTION

In describing the preferred embodiment of the present invention, reference will be made herein to FIGS. 1-4 of the drawings in which like numerals refer to like features of the invention.

The various embodiments of the invention are directed to improved processes for leaching precious metals from precious metal containing ores, as well as other precious metals containing materials. It should be appreciated that the term "precious metal" as used herein, either alone or in combination with other terms, refers to at least gold, platinum, silver, platinum group metals (e.g., palladium), and various other known metals that are of high value, in high demand, and/or are of limited resources.

As indicated below, several reactions occur during lixiviation of gold bearing ores and other gold bearing materials using known lixiviation processes of ammonium or non-ammonium thiosulfates with or without ammonium hydroxide and/or copper. These involves reacting a thiosulfate solution with a gold bearing solid material to result in the overall gold dissolution reaction depicted below in reaction (1).

$$Au(solid) + 2S_2O_3^{2-} \rightarrow Au(S_2O_3)_2^{3-} + e^- \quad (1)$$

When using oxygen is as an oxidant in an alkaline solution, the overall gold dissolution reaction during gold lixiviation depicted in reaction (1), takes the form shown below in reaction (2).

$$4Au(solid) + 8S_2O_3^{2-} + O_2 + 2H_2O \rightarrow 4Au(S_2O_3)_2^{3-} + 4OH^- \quad (2)$$

Ammonia and copper cations may be added to act as a catalyst for increasing the reaction rate of reaction (2). When ammonia and copper in thiosulfate solution are used, the above general equation (2) is achieved in the course of the following reactions:

$$Cu^{2+} + 4NH_3 \rightarrow Cu(NH_3)_4^{2+} \quad (3)$$

$$Au(solid) + Cu(NH_3)_4^{2+} \rightarrow + Au(NH_3)_2^+ + Cu(NH_3)_2^+ \quad (4)$$

$$Au(NH_3)_2^+ + 2S_2O_3^{2-} \rightarrow + Au(S_2O_3)_2^{3-} + 2NH_3 \quad (5)$$

$$Cu(NH_3)_2^+ + 3S_2O_3^{2-} \rightarrow Cu(S_2O_3)_3^{5-} + 2NH_3 \quad (6)$$

$$4Cu + O_2 + 2H_2O \rightarrow 4Cu^{2+} + 4OH^- \quad (7)$$

In the above known reactions, the formation of tetraaminecopper from reaction (3), takes place only at an alkaline pH and in the presence of ammonia. During leaching of the precious metal bearing ores and other gold bearing materials both the alkaline pH and ammonia required for the above reactions are maintained by adding ammonium hydroxide. Depending on the concentration of ammonium hydroxide introduced into solution, the pH is maintained between pH 9.5 to pH 11.5, although higher or lower pH values may be implemented. However, with the required use of ammonium hydroxide, ammonia, which is a volatile substance, rapidly evaporates in an open-air environment resulting in the lixiviation solution having decreased ammonium hydroxide concentrations leading to undesired low pH values and low gold dissolution rates. To overcome such problems, high concentrations of ammonium hydroxide, up to 0.5 M and even more are often added to the lixiviation solution, yet since ammonium hydroxide is one of the costlier constituents used in thiosulfate leaching, overall costs of the lixiviation process are undesirably increased, making it ineffective leaching many grades of ores.

Another undesired effect of adding high concentrations of ammonium hydroxide is that an excessive amount of tetraaminecopper is formed, which reacts with the thiosulfate in solution to form tetrathionate (i.e., reaction (8) is as follows:

$$2Cu(NH_3)_4^{2+} + 2S_2O_3^{2-} \rightarrow 2Cu(NH_3)_2^+ + S_4O_6^{2-} + 3NH_3. \qquad (8)$$

The above reaction depletes the concentration of thiosulfate in solution, which in turn, decreases the gold dissolution rate. Not only does the decrease of thiosulfate in solution interfere with the recovery of gold from the precious metal bearing material, it also increases costs of recycling the barren solution. Thus, excess amounts of ammonium hydroxide commonly used in lixiviating solution not only is costly, but also leads to the formation of excessive amount of tetraaminecopper, which in turn, rapidly degrades the thiosulfate resulting in the above negative impacts. Finally, tetrathionate, and other polythionates forming from tetrathionate, interfere with recovery of gold from pregnant solution by absorption on ion-exchange resins.

As for known lixiviation processes that use non-ammonium thiosulfate solutions without addition of ammonium hydroxide, reactions (3)-(8) shown above do not occur since ammonia is not present in the solution. In the absence of ammonium hydroxide, while the undesired formation of excessive amounts of tetraaminecopper is prevented, the reaction rate of gold leaching is substantially slower than the reaction rate of thiosulfate solutions in the presence of ammonium hydroxide and copper. For instance, gold dissolution rates may be one to two orders of magnitude lower when using thiosulfate solutions without ammonium hydroxide as compared to thiosulfate solutions with ammonium hydroxide and copper. The slow reaction rates, or gold dissolution rates, of known thiosulfate solutions without ammonium hydroxide make it undesirable in precious ore leaching despite other advantages associated with non-ammonium thiosulfates including, for instance, lower costs and higher stability as compared to thiosulfates with ammonium hydroxide and copper.

The present invention overcomes the above problems by providing improved methods, systems, solutions and/or compositions for leaching precious metals from precious metal bearing ores and/or materials using lixiviation solutions containing a thiosulfate based leaching component in combination with one or more alkaline earth metal hydroxides. The lixiviation solutions of the invention may optionally include the presence of copper cations in solution. In various embodiments, the present lixiviation solutions are particularly suitable for use in leaching gold from gold bearing ores and/or other gold bearing materials. The invention is also suitable for use in leaching other precious metals including, but not limited to, platinum, silver, and the like.

In accordance with one or more embodiments, the lixiviation solutions of the invention include ammonium thiosulfate or non-ammonium thiosulfate in combination with one or more alkaline earth metal hydroxides, and optionally the presence of copper cations. The invention avoids the need of adding expensive ammonium hydroxide, and in particular high concentrations of ammonium hydroxide, to a thiosulfate based lixiviation solution. Rather, it has been found introducing various alkaline earth metal hydroxides into the instant thiosulfate leaching solutions provides improved gold dissolution rates and yields, as compared to use of ammonium hydroxide. Another benefit of using alkaline earth metal hydroxides is decrease of degradation of thiosulfate present in solution when compared with ammonium hydroxide.

In the invention, when mixed with ammonium thiosulfate the alkaline earth metal hydroxides displace the ammonium from such ammonium thiosulfate to render a mixture of ammonium thiosulfate, alkaline earth metal(s) thiosulfate(s), ammonium hydroxide, ammonia, and alkaline earth metal(s) hydroxide(s). For instance, in those embodiments implementing magnesium hydroxide as the alkaline earth metal hydroxide, following chemical constituents are formed in the solution: $S_2O_3^{2-}$, $NH_4^+$, $OH^-$, $NH_3$, $Mg^{2+}$, $Mg(OH)_2$ (solid). As such, the ammonia required for the formation of tetraaminecopper is formed directly from the reaction between the ammonium thiosulfate and alkaline earth metal hydroxides, and additional ammonium hydroxide is not required in accordance with the invention. The ratios of the various constituents within the present thiosulfate lixiviation solutions depends on the type of alkaline earth metal hydroxide(s), and on the concentrations of each the thiosulfate component (e.g., ammonium or non-ammonium thiosulfate), the alkaline earth metal hydroxide, and on the poorly soluble magnesium hydroxide incubation time.

Figure 1:
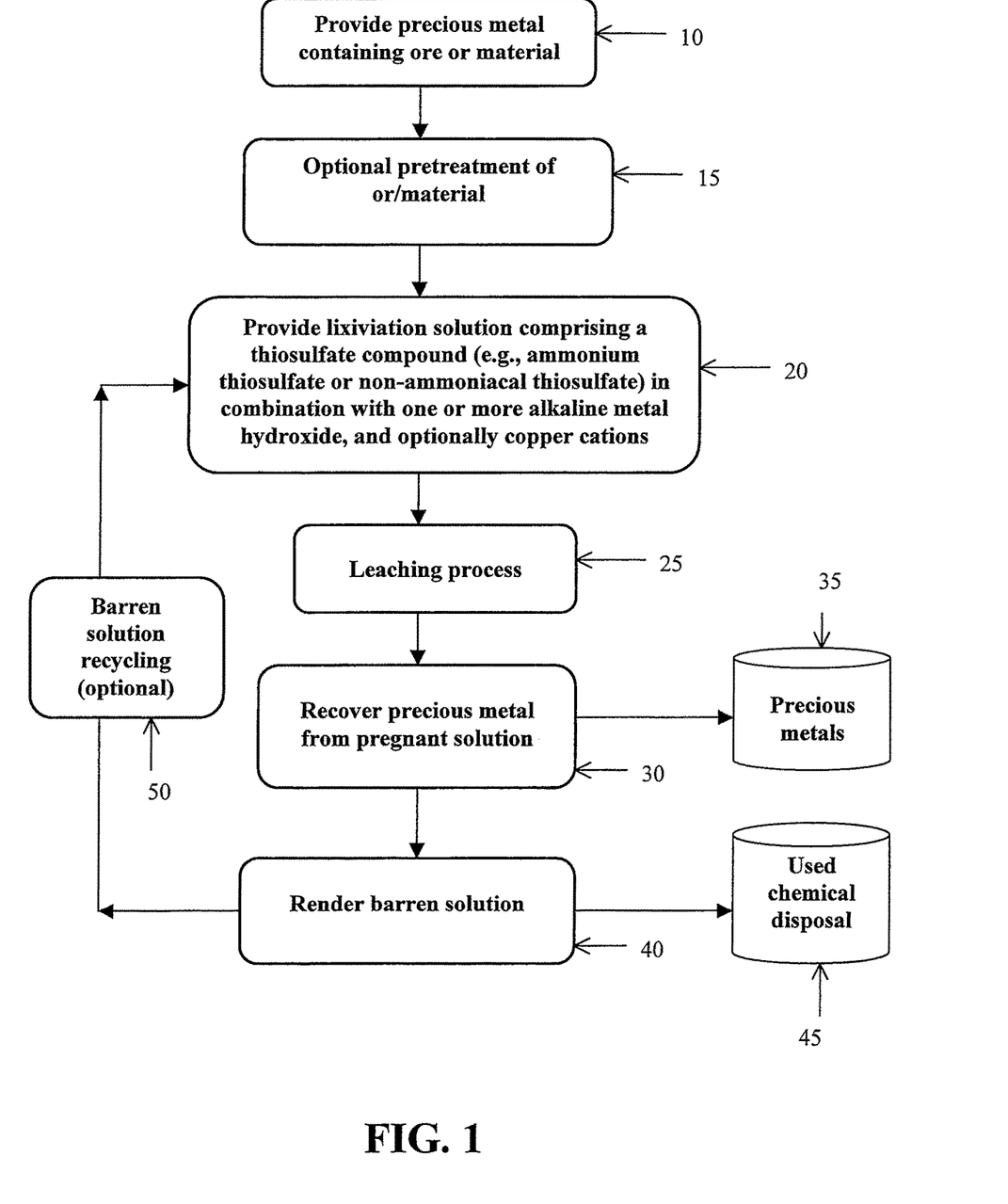
FIG. 1 is a flow chart depicting one or more process flows of leaching precious metals from precious metal bearing ores in accordance with one or more embodiments of the present invention.

Referring to the drawings, various examples of the invention were carried out in accordance with one or more embodiments of the invention. Exemplary process flows of the invention are shown in FIG. 1. In one or more embodiments, a metal containing material, preferably containing one or more precious metals, is provided (step 10). The precious metal bearing material may be provided as an ore or a slurry. Precious metal bearing material ores may include, for instance, a sized precious metal containing ore, a concentrate of precious metal containing ore. Precious metal containing ores suitable for use in the invention may have been treaded by one or more communition process including, for instance, crushing, grinding, cutting, and the like. The precious metal bearing material may also be a tailings from a concentrate or from other mineral processings, or a material prepared for heap leaching. It has been found that the invention is particularly suitable for use in leaching (or extracting) gold from gold containing ores or other materials. Thus, prior to treating the precious metal material with the various thiosulfate lixiviation solutions of the invention, the precious metal material may optionally be pretreated (step 15) in preparation of leaching using known pretreatment processes (e.g., communition, sizing, floatation, washing or cleaning the precious metal material, presoaking or preincubation in the lixiviating solution, and the like).

One or more of the thiosulfate lixiviation solutions of the invention is provided (step 20). The lixiviation solutions of the invention include a thiosulfate containing compound in combination with one or more alkaline earth metal hydroxide, and optionally copper cations. The thiosulfate containing compound may be an ammonium thiosulfate or a non-ammonium thiosulfate. These solutions can also be formed from alkaline metal thiosulfate, preferably magnesium thiosulfate and ammonium hydroxide as shown in reaction (9)

(9)

In continuing the process flow, the precious metal containing material is introduced or provided into the thiosulfate lixiviation solutions of the invention for a time period ranging from a few hours to several months (e.g., 2-6 months) to enable the leaching process (step 25). Processing conditions in accordance with the invention may include temperatures ranging from above 0° C. to 60° C., with preferred temperatures ranging from 5° C. to 45° C., and even more preferably from 20° C. to 30° C., in the presence of ambient air pressure, pressurized air, or an oxygen infused environment.

The leaching process renders a pregnant solution that contains the dissolved extractable precious metal leached from the precious metal containing material. Using known recovery methods, the leached precious metal(s) are then recovered from the pregnant solution (step 30). Known processes for recovering precious metals from the pregnant solution may be include, for instance, use of metallic zinc or copper, by the sulfides precipitation, by the borohydrates precipitation, or by resin in pulp (RIP) sorption. These extracted precious metal may then be stored (step 35) for later use. After recovery of the metals, a barren solution is rendered (step 40), which may either be disposed of (step 45) or recycled (step 50) for subsequent leaching processes or other uses. The barren solution may include various combinations of magnesium thiosulfate, calcium thiosulfate, ammonium thiosulfate, ammonium hydroxide, magnesium hydroxide, copper and other byproducts of thiosulfate degradation.

Referring to the present thiosulfate lixiviation solutions, in one or more embodiments the solution includes ammonium thiosulfate in combination with one or more alkaline earth metal hydroxides. For instance, the alkaline earth metal hydroxides may include, but are not limited to, magnesium hydroxide, calcium hydroxide, a combination of magnesium hydroxide and calcium hydroxide, or other alkaline earth metal(s) hydroxides. The ammonium thiosulfate and alkaline earth metal hydroxide solutions may also include copper cations for enhancing the leaching reactions rates and increasing leached metal yields. The copper cations within the present formulations may be provided as water soluble copper salts including, but not limited to, copper sulfate, copper nitrate, copper acetate, copper chloride, and like. For instance, the copper cations may be provided by adding copper sulfate or other water soluble salts of divalent copper to the ammonium thiosulfate and alkaline earth metal hydroxide solutions.

In other embodiments the solution includes non-ammonium thiosulfate in combination with one or more alkaline earth metal hydroxides. The non-ammonium thiosulfates may include, but are not limited to, sodium thiosulfate, potassium thiosulfate, magnesium thiosulfate, calcium thiosulfate, or combinations thereof. The alkaline earth metal hydroxides may include, but are not limited to, magnesium hydroxide, calcium hydroxide, a combination of magnesium hydroxide and calcium hydroxide, or other alkaline earth metal(s) hydroxides. Copper cations (e.g., copper sulfate) may also be added to the instant non-ammonium thiosulfate and alkaline earth metal hydroxide solutions to enhance the leaching reactions rates and increase leached metal yields.

In other embodiments the solution includes alkaline earth metal thiosulfate in combination with ammonium hydroxide. The alkaline earth metal hydroxides may include, but are not limited to, magnesium thiosulfate, a combination of magnesium thiosulfate and calcium thiosulfate, or a combination of magnesium thiosulfate and other non-ammonium thiosulfates. Copper cations (e.g., copper sulfate, copper nitrate, copper acetate, copper chloride, and the like) may also be added to the instant alkaline earth metal thiosulfate and ammonium hydroxide solutions to enhance the leaching reactions rates and increase leached metal yields.

While not meant to limit the invention, embodiments of the invention are described herein in connection with a number of exemplary leaching processes for leaching gold from a gold-containing material using different ammonium thiosulfate and alkaline earth metal hydroxides lixiviation solutions of the invention. In particular, in some of these exemplary embodiments, gold was leached from different gold bearing materials using ammonium thiosulfate in combination with magnesium hydroxide and/or calcium hydroxide. In some embodiments, copper sulfate was added to these solutions. The gold bearing materials include, but are not limited to, pure gold powder, pure gold flakes having certain thickness, gold bearing ores, gold bearing slurries, or other gold bearing materials.

In other examples, gold was leached from different gold bearing materials using a non-ammonium thiosulfate solution in combination with magnesium hydroxide and/or calcium hydroxide. The non-ammonium thiosulfates suitable for use in the invention include, but are not limited to, sodium thiosulfate, potassium thiosulfate, magnesium thiosulfate, calcium thiosulfate, and the like. These solutions were found to greatly accelerate gold dissolution rates and yields as compared to conventional non-ammonium thiosulfate lixiviation. In one or more preferred embodiments, the non-ammonium thiosulfate solution in combination with magnesium hydroxide and/or calcium hydroxide was also combined with copper (i.e., copper cations from copper sulfates). When copper sulfate is combined with the magnesium hydroxide and/or calcium hydroxide in these non-ammonium thiosulfate lixiviation solutions, it has been found that the gold dissolution rates and yields increased even further, as compared to solutions containing no copper (see, e.g., Table 7 below). It is believed that the copper in solution forms active complexes with the alkaline earth metal hydroxides, which in turn, react with the gold in the gold containing material to accelerate the dissolution thereof.

Through experimentation, while solutions of the invention comprising non-ammonium thiosulfate, magnesium hydroxide and copper showed lower gold dissolution rates as compared to the present ammonium thiosulfate solutions, the advantage of using the instant non-ammonium thiosulfate solutions is that they are suitable for use in processing environments and/or under conditions that are not suitable for use of ammonium thiosulfate based solutions. Even though dissolution rates and yields may be lower for the non-ammonium thiosulfate solutions of the invention, such embodiments provide less volatile and inexpensive lixiviation solutions that render adequate or sufficient yields or amounts of precious metals (e.g., gold).

For ease of understanding the invention, the following examples demonstrate various embodiments of the lixiviation solutions of the invention including a thiosulfate constituent in combination with one or more alkaline earth metal hydroxide. While embodiments are described herein in connection with leaching gold using one or more lixiviation solutions of the invention, it should be appreciated and understood that the foregoing are merely exemplary and are not meant to limit the scope of the invention in any manner.

Comparative example Set 1 is described in connection with Table 1 and FIG. 2. In one or more embodiments various combinations of the present lixiviation solutions were compared against conventional lixiviation solutions using ammonium hydroxide. A first series (Table 1 and line 2 on FIG. 2) of different lixiviation solution mixtures in accordance with embodiments of the invention included, in combination with various molar concentrations of ammonium thiosulfate, magnesium hydroxide, and copper sulfate. A second series (Table 1 and line 1 on FIG. 2) of different lixiviation solution mixtures in accordance with other embodiments included various combined molar concentrations of ammonium thiosulfate, magnesium hydroxide, calcium hydroxide, and copper sulfate. These different sets of the instant lixiviation solutions were compared against conventional lixiviation solutions (Series 3 in Table 1 and line 3 in FIG. 2) including different concentrations of ammonium thiosulfate, ammonium hydroxide, and copper sulfate.

In each of these embodiments conducted using the lixiviation solutions of example 1, leaching was performed on gold powder (99.5% purity) having an average mesh of 270 mesh. In accordance with the process flow of FIG. 1, in each of the examples 0.5 g of gold powder was introduced into 20 ml leaching solution. The lixiviation process was then performed in an open-to-air basket (i.e., in an open air environment) with constant stirring at 400 rpm for four (4) hours at 25° C. The results of these experiments are summarized in Table 1 below, and in the comparative graphical results depicted in FIG. 2.

sulfate solutions are 0.2 M and less, as compared to prior art leaching methods employing the use of ammonium thiosulfate in combination with ammonium hydroxide. The results of the invention are even further improved when a combination of magnesium hydroxide and calcium hydroxide are used in combination with ammonium thiosulfate and copper sulfate, which may be due to better prevention of gold passivation by calcium hydroxide. At low concentrations the present lixiviation solutions provide a significantly faster rate of gold dissolution with higher yields. As such, much lower concentrations (amounts) of the instant lixiviating solutions may be used thereby reducing costs of gold leaching without compromising gold dissolution rates and yields.

Figure 2:
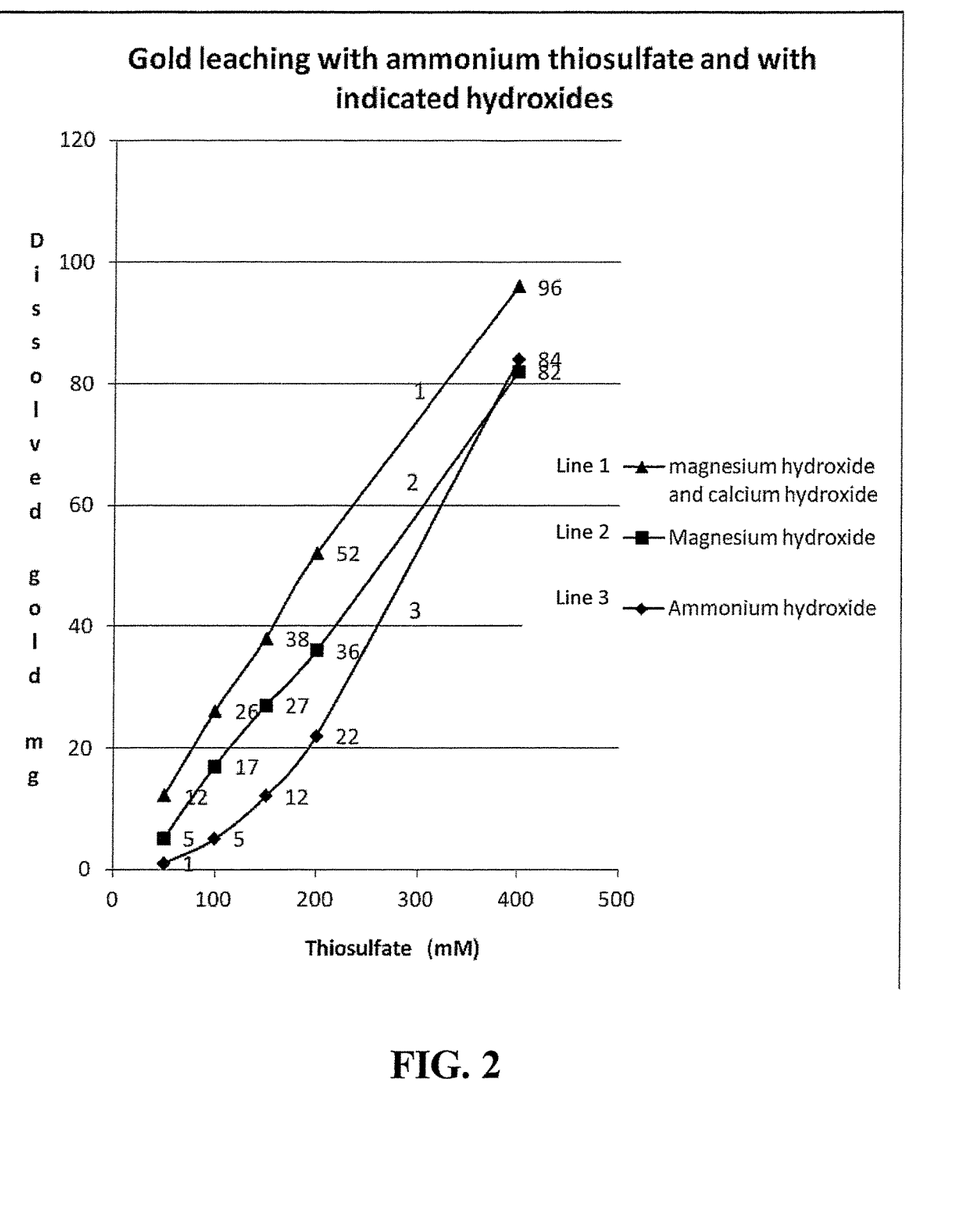
FIG. 2 is a comparative graphical depiction showing gold dissolution by lixiviation using ammonium thiosulfate in combination with alkaline earth metal hydroxides or ammonium hydroxide in accordance with the invention.

FIG. 2 graphically shows these comparative effects of various concentrations of ammonium thiosulfate in combination with the above different hydroxides on gold dissolution rate during leaching of gold powder. In one or more embodiments of the results depicted in FIG. 2, the molar concentrations of the constituents may include (line 1, series 2) a molar ratio of magnesium hydroxide to calcium hydroxide to ammonium thiosulfate to copper from (1 to 0.25 to 1 to 0.025) to (1 to 0.25 to 1 to 0.1), a molar ratio (line 2, series 1) of magnesium hydroxide to ammonium thiosulfate to copper sulfate from (1 to 1 to 0.25 to 1 to 1 to 0.1), and a molar ratio (line 3) of ammonium hydroxide to ammonium thiosulfate to copper sulfate from (2 to 1 to 0.25) to (2 to 1 to 0.1).

In these exemplary embodiments of the invention shown in Table 1 and FIG. 2, as well as other examples as discussed herein in relation to further examples, tables and figures, it is believed that the beneficial effect of magnesium hydroxide in the instant solutions is associated with magnesium hydroxide being poorly soluble in alkaline pH solutions having pKa=9.2 and upper limit of pH approximately 10.4 at maximum solved quantities of magnesium hydroxide.

TABLE 1

| Ammonium thiosulfate (M) | Magnesium hydroxide (M) | Calcium hydroxide (M) | Copper sulfate (M) | Ammonium hydroxide (M) (prior art) | Gold powder (g) | Extraction time (h) | Gold dissolved (mg) |
|---|---|---|---|---|---|---|---|
| Series 1 | | | | | | | |
| 0.4 | 0.4 | — | 0.01 | — | 0.5 | 4 | 82 |
| 0.2 | 0.2 | — | 0.01 | — | 0.5 | 4 | 36 |
| 0.15 | 0.15 | — | 0.01 | — | 0.5 | 4 | 27 |
| 0.1 | 0.1 | — | 0.01 | — | 0.5 | 4 | 17 |
| 0.05 | 0.05 | — | 0.005 | — | 0.5 | 4 | 5 |
| Series 2 | | | | | | | |
| 0.4 | 0.4 | 0.1 | 0.01 | — | 0.5 | 4 | 96 |
| 0.2 | 0.2 | 0.05 | 0.01 | — | 0.5 | 4 | 52 |
| 0.15 | 0.15 | 0.0375 | 0.01 | — | 0.5 | 4 | 38 |
| 0.1 | 0.1 | 0.0250 | 0.01 | — | 0.5 | 4 | 26 |
| 0.05 | 0.05 | 0.0125 | 0.005 | — | 0.5 | 4 | 12 |
| Series 3 (Prior Art) | | | | | | | |
| 0.4 | — | — | 0.01 | 1 | 0.5 | 4 | 84 |
| 0.2 | — | — | 0.01 | 0.5 | 0.5 | 4 | 22 |
| 0.15 | — | — | 0.01 | 0.3 | 0.5 | 4 | 12 |
| 0.1 | — | — | 0.01 | 0.25 | 0.5 | 4 | 5 |
| 0.05 | — | — | 0.005 | 0.1 | 0.5 | 4 | ~1 |

As shown in both Table 1 and FIG. 2, the present lixiviation solutions including at least a combination of ammonium thiosulfate, magnesium hydroxide, and copper sulfate (i.e., copper cations) dissolve gold at a better rate and render a higher yield of gold when concentrations of thio- Thus, the instant lixiviation solutions containing magnesium hydroxide are not clear solutions, rather they are suspensions containing undissolved magnesium hydroxide along with other ingredients and small amounts of dissolved magnesium hydroxide.

During precious metals leaching, the magnesium hydroxide slowly dissolves displacing ammonium from ammonium thiosulfate to generate small amounts of ammonium hydroxide and ammonia that is needed to form tetraaminecopper, as well as forming magnesium thiosulfate and maintaining alkaline pH (pH 9.2-9.8) in the solution that is needed for gold leaching. As the ammonia evaporates from solution in an open air environment, the pH of the solution decreases resulting in more magnesium hydroxide to dissolve, displace ammonium from ammonium thiosulfate, and to adjust the solution pH back to alkaline. This cycle repeats as long as there is undissolved magnesium hydroxide in the solution and will last until all ammonia evaporates from the solution, which may take days to complete. Thus magnesium hydroxide maintains both the concentration of ammonia and pH.

based solutions. In these embodiments various molar concentrations of the instant solutions comprising (series 1 on the Table 2 and line 1 on the FIG. 3) ammonium thiosulfate, copper sulfate, and magnesium hydroxide, and formulations comprising (Series 2 in the Table 2 and line 3 on FIG. 2) ammonium thiosulfate, copper sulfate, magnesium hydroxide, and calcium hydroxide, were comparatively tested against known solutions comprising different concentrations of ammonium thiosulfate, copper sulfate, and ammonium hydroxide (series 3 in the Table 2 and line 2 on the FIG. 3). The results of these experiments are summarized in the Table 2 and FIG. 3. In each of these experiments, leaching was performed on gold powder (99.5% purity, 270 mesh) with lixiviation being performed on 0.1 g of gold powder in 50 ml leaching solution in an open air basket with stirring at 400 rpm for ten (10) hours at 30° C.

TABLE 2

| Ammonium thiosulfate (M) | Copper sulfate (M) | Magnesium hydroxide (M) | Calcium hydroxide (M) | Ammonium hydroxide (M) (prior art) | Gold powder (g) | Leach time (h) | Gold dissolved (mg) |
|---|---|---|---|---|---|---|---|
| Series 1 | | | | | | | |
| 0.2 | 0.01 | 0.2 | — | — | 0.1 | 10 | 73 |
| 0.1 | 0.01 | 0.1 | — | — | 0.1 | 10 | 49 |
| 0.05 | 0.005 | 0.05 | — | — | 0.1 | 10 | 31 |
| Series 2 | | | | | | | |
| 0.2 | | 0.2 | | — | 0.1 | 10 | 6.5 |
| 0.1 | | 0.1 | | — | 0.1 | 10 | 4 |
| 0.05 | | 0.05 | | — | 0.1 | 10 | 2 |
| Series 3 | | | | | | | |
| 0.2 | 0.01 | — | — | 0.4 | 0.1 | 10 | 54 |
| 0.1 | 0.01 | — | — | 0.2 | 0.1 | 10 | 35 |
| 0.05 | 0.005 | — | — | 0.1 | 0.1 | 10 | 19 |

In the exemplary embodiments of the invention, it was found that the pH of the instant magnesium hydroxide based lixiviation solutions did not drop below pH=9.5 to 9.7 after ten hours of leaching, thereby providing a more stable lixiviating solution as compared to known ammonium hydroxide based solutions. The instant processes and solutions are also beneficial since any evaporated ammonia during leaching is replaced with the fresh ammonium displaced from ammonium thiosulfate by the freshly dissolving magnesium hydroxide.

In one or more embodiments, when calcium hydroxide is added to the instant solutions in combination with magnesium hydroxide and ammonium thiosulfate the results of the invention are even further improved. While calcium hydroxide only in combination with ammonium thiosulfate did not prove as effective in gold dissolution (see, e.g., FIG. 4), when combined with ammonium thiosulfate, magnesium hydroxide, and copper sulfate (as in FIG. 2) gold dissolution rates and yields were significantly improved. This effect may be contributed to prevention of passivation of gold by calcium, while magnesium hydroxide provide increased gold dissolution rate. It has also been found that copper cations are beneficial in combination with the alkaline earth metal(s) hydroxide(s) in the instant solutions for enhancing the leaching process and substantially increasing the rate of gold dissolution (see at least, e.g., Tables 1 and 2 herein, and FIGS. 2-4).

Figure 3:
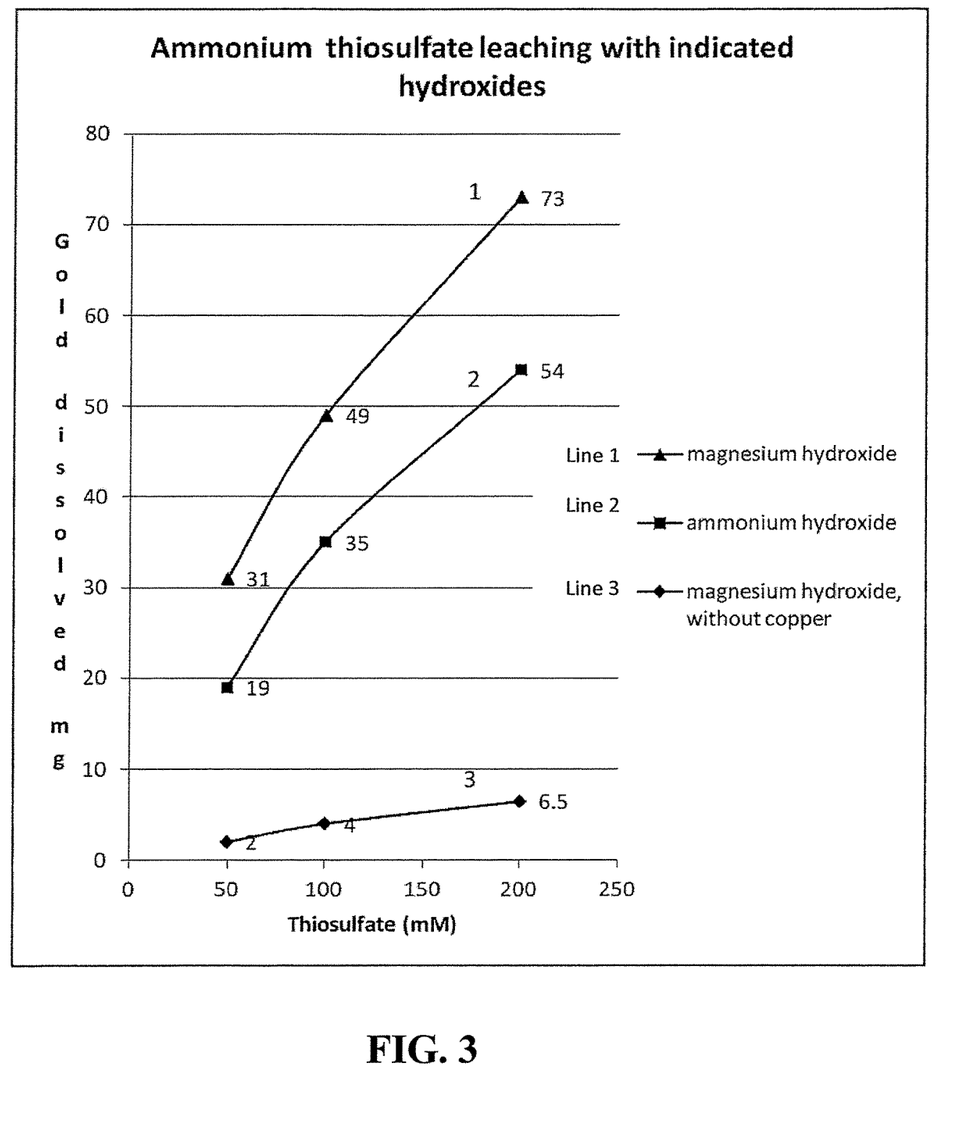
FIG. 3 is another comparative graphical depiction showing gold dissolution by lixiviation using ammonium thiosulfate in combination with alkaline earth metal hydroxides in accordance with other embodiments of the invention.

Comparative example Set 2 is described in connection with Table 2 and FIG. 3. In one or more other embodiments, exemplary lixiviation solutions of the invention were prepared and comparatively tested against known ammonia FIG. 3 graphically shows these comparative effects of various concentrations of ammonium thiosulfate in combination with the different hydroxides on gold dissolution rate during leaching of gold powder. In one or more embodiments, the molar concentrations of the constituents may include (series 1, line 1) a molar ratio of ammonium thiosulfate to copper to magnesium hydroxide from (1 to 0.05 to 1) to (1 to 0.1 to 1), a molar ratio (series 2, line 3) of magnesium hydroxide to ammonium thiosulfate of (1 to 1), and a molar ratio (series 3, line 2) of ammonium hydroxide to copper sulfate to ammonium thiosulfate to copper sulfate from (2 to 1 to 0.05) to (2 to 1 to 0.1).

Comparative example Set 3 is described below in connection with Table 3 and FIG. 4. In one or more embodiments, exemplary lixiviation solutions of the invention were prepared and comparatively tested against known ammonia based solutions. In these embodiments various molar concentrations of the instant solutions comprising (set 1) ammonium thiosulfate, copper sulfate, and magnesium hydroxide, and formulations comprising (set 2) ammonium thiosulfate, copper sulfate, magnesium hydroxide, and calcium hydroxide, were comparatively tested against known solutions comprising different concentrations of ammonium thiosulfate, copper sulfate, and ammonium hydroxide. The results of these experiments are summarized in the Table 2 and FIG. 3. In each of these experiments, leaching was performed on gold powder (99.5% purity, 270 mesh) with lixiviation being performed on 0.5 g of gold powder in 50 ml leaching solution in an open air basket with stirring at 400 rpm at 25° C.

TABLE 3

| Ammonium thiosulfate (M) | Copper sulfate (M) | Magnesium hydroxide (M) | Calcium hydroxide (M) | Ammonia (M)(prior art) | Gold powder (g) | Leach time (h) | Gold dissolved (mg) |
|---|---|---|---|---|---|---|---|
| Series 1 | | | | | | | |
| 0.2 | 0.01 | 0.2 | — | — | 0.5 | 10 | 124 |
| 0.1 | 0.01 | 0.1 | — | — | 0.5 | 10 | 71 |
| 0.05 | 0.005 | 0.05 | — | — | 0.5 | 10 | 41 |
| Series 2 | | | | | | | |
| 0.2 | 0.01 | — | 0..2 | — | 0.5 | 10 | 16 |
| 0.1 | 0.01 | — | 0.1 | — | 0.5 | 10 | 9 |
| 0.05 | 0.005 | — | 0.05 | — | 0.5 | 10 | 3 |
| Series 3 | | | | | | | |
| 0.2 | 0.01 | — | — | 0.4 | 0.5 | 10 | 77 |
| 0.1 | 0.01 | — | — | 0.2 | 0.5 | 10 | 48 |
| 0.0.5 | 0.005 | — | — | 0.1 | 0.5 | 10 | 25 |

Figure 4:
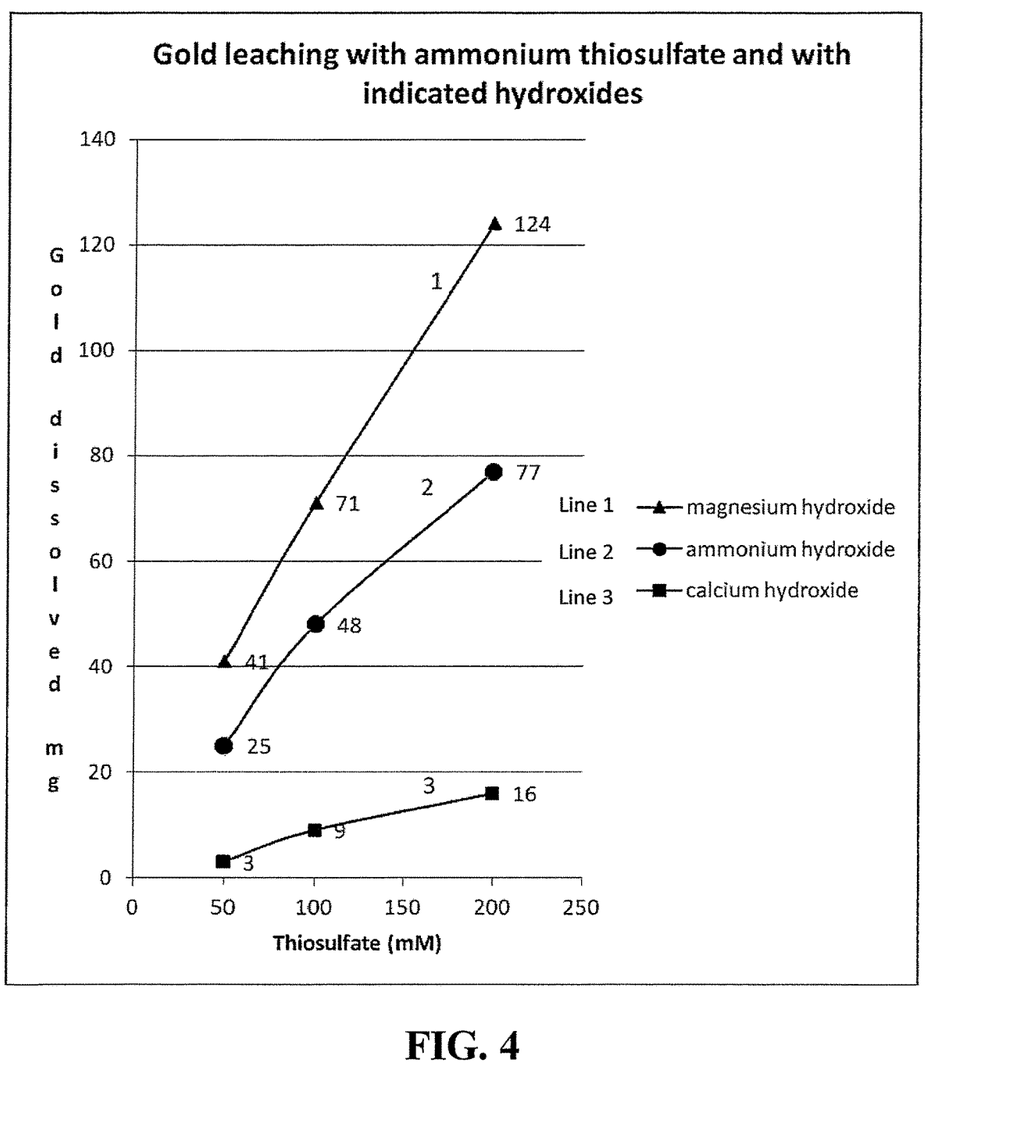
FIG. 4 is yet another comparative graphical depiction showing gold dissolution by lixiviation using ammonium thiosulfate in combination with alkaline earth metal hydroxides in accordance with still other embodiments of the invention.

FIG. 4 graphically shows these comparative effects of various concentrations of ammonium thiosulfate in combination with the different hydroxides on gold dissolution rate during leaching of gold powder as shown above in Table 3. In one or more embodiments, the molar concentrations of the constituents may include a molar ratio of ammonium thiosulfate to copper to magnesium hydroxide to calcium hydroxide from (1 to 0.05 to 1 to 0.25) to (1 to 0.1 to 1), a molar ratio of magnesium hydroxide to ammonium thiosulfate of (1 to 1 to 0.05), and a molar ratio of ammonium hydroxide to ammonium thiosulfate to copper sulfate of (2 to 1 to 0.05).

Comparative example Set 4 is described below in relation to Table 4. In these exemplary embodiments of the invention various molar concentrations of the solutions of the invention including ammonium thiosulfate, copper sulfate, and magnesium hydroxide were compared against know solutions ammonium thiosulfate, copper sulfate, and ammonium hydroxide. Lixiviation was carried out using 0.5 g of gold powder (99.5% purity, 270 mesh) in 20 ml while stirring at 400 rpm in open to air basket. After one (1) hour dissolved gold amount was determined. These results show that the instant leaching solutions retain their gold dissolving capacity after 24 hours of stirring in open to air container, while known ammonium hydroxide based solutions lose their capacity to dissolve gold over such time. Also shown by these results, the present ammonium thiosulfate and alkaline earth metal(s) hydroxide(s) lixiviation solutions show improved and superior results over known ammonium thiosulfate and ammonium hydroxide solutions. It is believed that these results may be due to rapid evaporation of ammonium from ammonium hydroxide, while magnesium hydroxide based solutions produce ammonium at slow rates over a prolonged amount of time.

TABLE 4

| Ammonium thiosulfate (M) | Copper sulfate (M) | Magnesium hydroxide (M) | Ammonium hydroxide (M) (prior art) | Gold powder (g) | Lixiviating solution preincubation (h) | Leach time (h) | Gold dissolved (mg) |
|---|---|---|---|---|---|---|---|
| 0.2 | 0.01 | 0.2 | — | 0.5 | 0 | 1 | 16.5 |
| 0.2 | 0.01 | — | 0.5 | 0.5 | 0 | 1 | 9.5 |
| 0.2 | 0.01 | 0.2 | — | 0.5 | 10 | 1 | 15 |
| 0.2 | 0.01 | — | 0.5 | 0.5 | 10 | 1 | 6 |
| 0.2 | 0.01 | 0.2 | — | 0.5 | 24 | 1 | 12 |
| 0.2 | 0.01 | — | 0.5 | 0.5 | 24 | 1 | 1.5 |

Comparative example Set 5 is described below in relation to Table 5. These exemplary embodiments were carried out to determine the time required for complete dissolution of gold having a predetermined thickness. Various molar concentrations of the lixiviation solutions of the invention and prior art were prepared (as detailed in the below table), followed by providing 5 mg of 2.5μ thick pure gold (99.5%) flakes into such solutions. Lixiviation was carried out under a constant stir rate until complete dissolution of gold flakes was obtained. The results of Table 5 demonstrate that magnesium hydroxide alone, or in combination with calcium hydroxide, is a very potent leaching agent which fully dissolves 2.5μ gold flakes in 1.5 to 2 hours. These rates were comparable or faster than known leaching solutions having ammonium hydroxide.

TABLE 5

| Ammonium thiosulfate (M) | Copper sulfate (M) | Magnesium hydroxide (M) | Calcium hydroxide (M) | Ammonia (M) (prior art) | 2.5μ thick gold flakes (mg) | Time required for full dissolution (h) |
|---|---|---|---|---|---|---|
| 0.4 | 0.01 | 0.4 | — | — | 5 | 1.5-2 |
| 0.4 | 0.01 | 0.4 | 0.1 | — | 5 | 1.5-2 |
| 0.4 | 0.01 | — | 0.4 | — | 5 | (N.D.) |
| 0.4 | 0.01 | — | — | 0.8 | 5 | 2-3 |

Comparative example Set 6 is described below in connection with Table 6. In these embodiments of the invention, the present lixiviation solutions including non-ammonium thiosulfates were tested and demonstrated improved rates and yields over prior art lixiviation solutions. The non-ammonium thiosulfates include, but are not limited to, magnesium thiosulfate, calcium thiosulfate, sodium thiosulfate, potassium thiosulfate, and the like. Like that of the ammonium thiosulfates based lixiviation solutions of the invention, various molar concentrations of the instant lixiviation solutions were prepared using non-ammonium thiosulfates in combination with alkaline earth metals, and preferably with copper cations.

In these experiments, 0.5 mg of pure gold powder (99.5%; less than 270 mesh size) was employed and introduced into 50 ml or 100 ml of the various leaching solutions detailed below in Table 6. The volumes of the different solutions are indicated below. Lixiviation was performed in an open to air environment basket with stirring at 400 rpm for a time period of ten (10) hours. The various exemplary embodiments employed using lixiviation solution formulations in amounts including: (1) 100 ml of a combination of calcium thiosulfate, magnesium hydroxide and copper sulfate; (2) 100 ml of a combination of magnesium thiosulfate, calcium hydroxide and copper sulfate; and (3) 50 ml of a combination of sodium thiosulfate, magnesium hydroxide and copper sulfate. The prior art solution included 50 ml of a combination of sodium thiosulfate and copper sulfate.

As detailed in Table 6 above, the results of these experiments show that each of the instant non-ammonium thiosulfate based solutions, when combined with one or more alkaline earth metal hydroxides and copper cations, provide reliable gold dissolution rates and yields. The instant non-ammonium thiosulfate based solutions are particularly suitable for use in processing environments where known ammonium thiosulfate combined with ammonium hydroxide lixiviation solutions are not suitable for use.

Referring to Table 7 below, Example Set 7 of the invention is depicted whereby various exemplary non-ammonium thiosulfate based solutions of the invention were tested to determine the time required for complete dissolution of gold having a predetermined thickness. In these examples, various molar concentrations of non-ammonium thiosulfate lixiviating solutions of the invention were prepared (as detailed in the below table), followed by providing 5 mg of 2.5μ thick pure gold (99.5%) flakes into such solutions. Lixiviation was carried out under a constant stir rate until complete dissolution of gold flakes was obtained. The results of Table 7 demonstrate that in these non-ammonium thiosulfate solutions, the magnesium hydroxide alone, or in combination with calcium hydroxide, is a very potent leaching agent which fully dissolves 2.5μ gold flakes in 18 to 26 hours. The calcium hydroxide based solutions in combination with magnesium thiosulfate and copper have similar gold dissolution rate.

TABLE 6

| Magnesium thiosulfate (M) | Calcium thiosulfate (M) | Sodium thiosulfate (M) | Copper sulfate (M) | Magnesium hydroxide (M) | Calcium hydroxide (M) | Gold powder (g) | Leach time (h) | Gold dissolved (mg) |
|---|---|---|---|---|---|---|---|---|
| 0.2 | — | — | — | 0.1 | — | 0.5 | 10 | <2 |
| 0.2 | — | — | 0.01 | 0.1 | — | 0.5 | 10 | 35 |
| 0.1 | — | — | — | 0.1 | — | 0.5 | 10 | <2 |
| 0.1 | — | — | 0.01 | 0.1 | — | 0.5 | 10 | 21 |
| — | 0.2 | — | — | 0.1 | — | 0.5 | 10 | <2 |
| — | 0.2 | — | 0.01 | 0.1 | — | 0.5 | 10 | 32 |
| — | 0.1 | — | — | 0.1 | — | 0.5 | 10 | <2 |
| — | 0.1 | — | 0.01 | 0.1 | — | 0.5 | 10 | 19 |
| 0.1 | — | — | — | — | 0.1 | 0.5 | 10 | <2 |
| 0.1 | — | — | 0.01 | — | 0.1 | 0.5 | 10 | 23 |
| — | — | 0.2 | 0.01 | 0.1 | — | 0.5 | 10 | 6 |
| prior art | | 0.2 | — | | | 0.5 | 10 | <2 |
| prior art | | 0.2 | 0.01 | | | 0.5 | 10 | <2 |
| prior art | | 0.1 | — | | | 0.5 | 10 | <2 |
| prior art | | 0.1 | 0.01 | | | 0.5 | 10 | <2 |

TABLE 7

| Magnesium thiosulfate (M) | Copper sulfate (M) | Magnesium hydroxide (M) | Calcium hydroxide (M) | 2.5 μ thick gold flakes (mg) | Time required for full dissolution (h) |
|---|---|---|---|---|---|
| 0.2 | 0.01 | 0.05 | — | 5 | 18-26 |
| 0.2 | 0.01 | — | 0.05 | 5 | 18-26 |
| 0.2 | — | 0.05 | — | 5 | N.D. |

Comparative example Set 8 is described below in relation to Table 8. These exemplary embodiments were carried out to determine the rate of gold recovery from ores. In these experiments solutions of the invention were compared against known solutions, whereby lixiviation was carried out on gold extracted from 200 mesh pressure oxidized double refractory preg-robbing gold bearing ore having approximately 3 to 4 mg/kg gold. The extraction was performed in an open air environment with instant ammonium thiosulfate lixiviating solutions and those of the prior art. Oxygenation of each slurry was accomplished by stirring such slurries at 200 rpm for an extraction/leaching time period of eight (8) hours. After leaching was complete, gold was precipitated from the pregnant solution and the amount of extracted gold measured. In these examples, it is shown that the alkaline earth metals hydroxides of the instant lixiviating solutions provide comparable or better yields of gold recovery from gold bearing ores, as compared to the volatile and costlier prior art solutions.

TABLE 8

| Type of the ore | $(NH_4)_2S_2O_3$ M | Cu2+ mM | $Mg(OH)_2$ M | $Ca(OH)_2$ M | $NH_4OH$ M (prior art) | Gold recovery (%) | Remarks |
|---|---|---|---|---|---|---|---|
| "GS" - pressure oxidized double refractory preg robbing ore | 0.1 | 5 | 0.1 | — | — | 87% | Open to air leaching, 8 h, 25° C., 200 rpm |
| "—" | 0.1 | 5 | 0.1 | 0.0125 | — | 84% | "—" |
| "—" | 0.1 | 5 | — | 0.08 | — | 78% | "—" |
| "—" | 0.1 | 5 | — | — | 0.2 | 84% | "—" |

Example Set 9 is described below in relation to Table 9. In the following exemplary embodiments the rate of gold recovery from ores using the lixiviating solutions of the invention was determined using gold extracted from 200 mesh pressure oxidized double refractory preg-robbing gold bearing ore having approximately 3 to 4 mg/kg gold. Extraction or leaching was performed in a closed air environment (i.e., a closed to air container) with stirring at 120 rpm. The leaching process was carried out for twenty-four (24) hours at approximately 25° C. After extraction was complete, the amount of the extracted gold from the ore was measured. It was found that the alkaline earth metal hydroxides solutions of the invention provide good gold recovery from gold bearing ores, even at very low 10 mM concentration of ammonium thiosulfate, copper sulfate (1 mM) and magnesium hydroxide (10 mM). These low concentrations or amounts of chemical components advantageously reduce costs of the lixiviation process. The molar ratio of ammonium thiosulfate to magnesium hydroxide to copper was (1 to 0.5 to 0.05).

TABLE 9

| Type of the ore | $(NH_4)_2S_2O_3$ M | Cu2+ mM | $Mg(OH)_2$ M | Gold recovery (%) | Remarks |
|---|---|---|---|---|---|
| "GS" - pressure oxidized double refractory preg robbing ore | 0.1 | 5 | 0.05 | 91% | Close to air leaching, 24 h, 25° C. 120 rpm |
| "GS" - pressure oxidized double refractory preg robbing ore | 0.05 | 2 | 0.02 | 86% | Close to air leaching, 24 h, 25° C. 120 rpm |

TABLE 9-continued

| Type of the ore | $(NH_4)_2S_2O_3$ M | Cu2+ mM | $Mg(OH)_2$ M | Gold recovery (%) | Remarks |
|---|---|---|---|---|---|
| "GS" - pressure oxidized double refractory preg robbing ore | 0.02 | 1 | 0.01 | 79% | Close to air leaching, 24 h, 25° C. 120 rpm |
| "GS" - pressure oxidized double refractory preg robbing ore | 0.01 | 0.5 | 0.01 | 71% | Close to air leaching, 24 h, 25° C. 120 rpm |

Example Set 10 is described below in relation to Table 10. In the following exemplary embodiments the rate of gold recovery from ores using the lixiviating solutions of the invention was determined using gold extracted from 200 mesh pressure oxidized double refractory preg-robbing gold bearing ore having approximately 3 to 4 mg/kg gold. Extraction or leaching was performed in an open air environment (i.e., an open to air container) with stirring at 250 rpm. The leaching process was carried out from twenty-four (24) hours to seventy-two (72) hours at approximately 25° C. After extraction was complete, the amount of extracted gold from the ore was measured. It was found that the alkaline earth metal hydroxides solutions of the invention provide that gold recovery reaches plateau after 24 hours of leaching with little gold recovering afterward. It also shows that lixiviation solution remains active during 72 hours, with no dissolved gold decrease. The molar ratio of ammonium thiosulfate to magnesium hydroxide to copper was (1 to 1 to 0.01).

TABLE 10

| Type of the ore | $(NH_4)_2S_2O_3$ M | $Mg(OH)_2$ M | Cu2+ mM | % of gold recovery | Leach time (hours) | Remarks |
|---|---|---|---|---|---|---|
| "GS" - pressure oxidized double refractory preg robbing ore | 0.1 | 0.1 | 1 | 68% | 24 | Open to air leaching, 25° C. 250 rpm |
| "—" | 0.1 | 0.1 | 1 | 73% | 48 | "—" |
| "—" | 0.1 | 0.1 | 1 | 71% | 72 | "—" |

Example Set 11 is described below in relation to Table 11. In the following exemplary embodiments the rate of gold recovery from ores using the lixiviating solutions of the invention was determined using gold extracted from 200 mesh pressure oxidized double refractory preg-robbing gold bearing ore having approximately 3 to 4 mg/kg gold. Extraction or leaching was performed in an closed air environment (i.e., an closed to air container) with stirring at 250 rpm. The leaching process was carried out from twenty-four (24) hours at approximately 25° C. After extraction was complete, the amount of extracted gold from the ore was measured. It was found that the alkaline earth metal hydroxides solutions of the invention, magnesium hydroxide solution in particular, provide good gold recovery at very low thiosulfate and copper cations concentration of only 0.005 M and 0.1 mM respectively, more than one order of magnitude lower than bast described thiosulfate solutions in prior art. These low concentrations or amounts of chemical components advantageously reduce costs of the lixiviation process. The molar ratio of ammonium thiosulfate to magnesium hydroxide to copper was from (1 to 1 to 0.02) to (1 to 20 to 0.02).

TABLE 11

| Type of the ore | $(NH_4)_2S_2O_3$ M | $Mg(OH)_2$ M | Cu2+ mM | % of gold recovery and leach time | Leach time | Remarks |
|---|---|---|---|---|---|---|
| "GS" - pressure oxidized double refractory preg robbing ore | 0.1 | 0.1 | 2 | 87%-24 h | 24 h | Close to air leaching, 25° C., 250 rpm |

TABLE 11-continued

| Type of the ore | $(NH_4)_2S_2O_3$ M | $Mg(OH)_2$ M | Cu2+ mM | % of gold recovery and leach time | Leach time | Remarks |
|---|---|---|---|---|---|---|
| "—" | 0.05 | 0.1 | 1 | 88% | 24 h | "—" |
| "—" | 0.02 | 0.1 | 0.4 | 86% | 24 h | "—" |
| "—" | 0.01 | 0.1 | 0.2 | 87% | 24 h | "—" |
| "—" | 0.005 | 0.1 | 0.1 | 85% | 24 h | "—" |

Example Set 12 is described below in relation to Table 12. In the following exemplary embodiments the rate of gold recovery from ores using the lixiviating solutions of the invention was determined using gold extracted from 200 mesh pressure oxidized double refractory preg-robbing gold bearing ore having approximately 3 to 4 mg/kg gold. Extraction or leaching was performed in a closed air environment (i.e., a closed to air container) with stirring at 250 rpm. The leaching process was carried out from twenty-four (24) hours at approximately 25° C. After extraction was complete, the amount of extracted gold from the ore was measured. It was found that the alkaline earth metal hydroxides solutions of the invention, magnesium hydroxide in particular, provide good gold recovery with oxide refractory ore at very low thiosulfate and copper cations concentration of only 0.02 to 0.01 M and 0.4 to 0.2 mM respectively. These low concentrations or amounts of chemical components advantageously reduce costs of the lixiviation process. The molar ratio of ammonium thiosulfate to magnesium hydroxide to copper from (1 to 1 to 0.02) to (1 to 20 to 0.02).

TABLE 12

| Type of the ore | $(NH_4)_2S_2O_3$ M | $Mg(OH)_2$ M | Cu2+ mM | % of gold recovery and leach time | Leach time | Remarks |
|---|---|---|---|---|---|---|
| "AU-C10"- oxide refractory ore | 0.1 | 0.1 | 2 | 78% | 24 h | Close to air leaching, 25°C., 400 rpm |
| "—" | 0.05 | 0.1 | 1 | 74% | 24 h | "—" |
| "—" | 0.02 | 0.1 | 0.4 | 76% | 24 h | "—" |
| "—" | 0.01 | 0.1 | 0.2 | 72% | 24 h | "—" |
| "—" | 0.005 | 0.1 | 0.1 | 62% | 24 h | "—" |

Example Set 13 is described below in relation to Table 13. In the following exemplary embodiments the rate of gold recovery from ores using the lixiviating solutions of the invention was determined using gold extracted from 200 mesh pressure oxidized double refractory preg-robbing gold bearing ore having approximately 3 to 4 mg/kg gold. Extraction or leaching was performed in an environment closely approaching heap leacing (e.g. in a glass column packed with ore). The leaching process was carried out from twenty-four (72) hours at approximately 25° C. After extraction was complete, the amount of extracted gold from the ore was measured. It was found that the alkaline earth metal hydroxides solutions of the invention, magnesium hydroxide in particular, provide good gold recovery at very low thiosulfate and copper cations concentration of only 0.005 M and 0.1 mM respectively in heap leaching environment. These low concentrations or amounts of chemical components in combination with least expensive heap leaching advantageously reduce costs of the lixiviation process. The molar ratio of ammonium thiosulfate to magnesium hydroxide to copper was from (0.2 to 1 to 0.0001).

TABLE 13

| Type of the ore | $(NH_4)_2S_2O_3$ M | $Mg(OH)_2$ M | Cu2+ mM | % of gold recovery and leach time | Leach time | Remarks |
|---|---|---|---|---|---|---|
| "GS" - pressure oxidized double refractory preg robbing ore | 0.02 | 0.1 | 0.1 | ~80% | 72 h | Heap leaching, 25° C., ~0.2 ml/cm²/h |
| "AU-C10" - oxide refractory ore | 0.02 | 0.1 | 0.1 | ~70% | 72 h | Heap leaching, 25° C., ~0.2 ml/cm²/h |

In accordance with the various embodiments of the invention, the present lixiviation solutions including a thiosulfate component, one or more alkaline earth metal hydroxides, and preferably copper cations, provide improved methods, systems and compositions for leaching precious metals from a precious metal containing material. The invention provides lixiviation solutions that render sufficient precious metal dissolution rates and yields, while at the same time, offering a lower cost, lower toxicity and easier leaching processes, as compared to known thiosulfate lixiviation solutions that include ammonium hydroxide. The invention enables better gold dissolution rates, better yields, and improved stability of thiosulfate during lixiviation by providing lixiviation solutions comprising an ammonium or non-ammonium thiosulfate component in combination with one or more alkaline earth metal hydroxides, with or without copper cations.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method for extracting precious metal from a material comprising:
    providing a precious metal containing material;
    providing a lixiviating solution comprising
        one or more thiosulfate components, wherein at least one of said one or more thiosulfate components is ammonium thiosulfate, and
        one or more alkaline earth metal hydroxides, wherein at least one of said one or more alkaline earth metal hydroxides forming-a suspension comprising undissolved magnesium hydroxide and dissolved magnesium hydroxide;
    introducing the lixiviating solution into the precious metal containing material;
    lixiviating the precious metal containing material using said lixiviating solution, whereby, undissolved magnesium hydroxide gradually dissolves in the lixiviating solution thereby maintaining an alkaline pH and generating additional hydroxide ions, which in turn, generates additional ammonia, within said lixiviating solution while leaching said precious metal from said material to render a pregnant solution containing said leached precious metal; and
    recovering the leached precious metal from the pregnant solution.

2. The method of claim 1 wherein the lixiviating solution further comprises copper cations wherein tetraamminecopper is generated and maintained within said lixiviating solution during lixiviation without adding ammonium hydroxide, titrates and pH buffers.

3. The method of claim 2 wherein the stoichiometric ratio of copper cations to ammonium thiosulfate is between 1:10000 to 1:5.

4. The method of claim 2 wherein the copper cations are provided by water soluble copper salts.

5. The method of claim 1 wherein the ammonium thiosulfate component is present in the lixiviating solution in a concentration ranging from about 0.001 M to about 0.5 M.

6. The method of claim 1 wherein the one or more thiosulfate components comprise a combination of two or more of sodium thiosulfate, potassium thiosulfate, magnesium thiosulfate, calcium thiosulfate, and ammonium thiosulfate, wherein one of two or more thiosulfate components is ammonium thiosulfate.

7. The method of claim 1 wherein the suspension comprising undissolved magnesium hydroxide and dissolved magnesium hydroxide maintains alkaline pH and ammonia concentration of the lixiviation solution when pH and/or ammonia concentration during lixiviation is changing.

8. The method of claim 7 wherein the undissolved magnesium hydroxide and dissolved magnesium hydroxide component is present in the lixiviating solution in a concentration ranging from 0.001 M to 1 M.

9. The method of claim 1 wherein the precious metal containing material is a concentrate of precious metal containing ore, tailings from concentrate, or from mineral processing.

10. The method of claim 1 wherein the precious metal containing material is a material prepared for heap leaching, agitation leaching, tank leaching, or column leaching.

11. The method in claim 1 wherein the precious metal containing material is a precious metal containing ore treated by a comminution process selected from the group consisting of crushing, grinding, and cutting.

12. The method of claim 1 wherein the precious metal containing material is a precious metal containing ore, sized precious metals containing ore, or slurry.

13. The method of claim 1 wherein the precious metal containing material contains a material selected from the group consisting of gold, platinum, palladium, silver, and combinations thereof.

14. The method of claim 13 wherein the material leached from the precious metal material is gold.

15. A method for extracting precious metal from a material comprising:
    providing a precious metal containing material;
    providing a lixiviating solution comprising
        one or more non-ammonium thiosulfate components, wherein at least one of said one or more non-ammonium thiosulfate components is magnesium thiosulfate; and
        one or more alkaline earth metal hydroxides, ammonium hydroxide, or a combination thereof, wherein the one or more non-ammonium thiosulfate component and the one or more alkaline earth metal hydroxides, ammonium hydroxide, or combination thereof, form a precipitate of magnesium hydroxide and maintain an alkaline pH of the lixiviating solution;
    introducing the lixiviating solution into the precious metal containing material;
    leaching said precious metal from said material to render a pregnant solution containing said leached precious metal; and
    recovering the leached precious metal from the pregnant solution.

16. The method of claim 15 wherein the magnesium thiosulfate is present in the lixiviating solution in a concentration ranging from about 0.0002 M to about 2 M.

17. The method of claim 15 wherein the one or more alkaline earth metal hydroxides comprises magnesium hydroxide in an amount that forms an undissolved suspension or slurry in the lixiviating solution the stoichiometric ratio of the magnesium hydroxide to the non-ammonium thiosulfate is between 1:50 to 1000:1.

18. The method of claim 15 wherein the one or more alkaline earth metal hydroxides comprises a combination of magnesium hydroxide and calcium hydroxide.

19. The method of claim 15 wherein the lixiviating solution further includes copper cations, the stoichiometric ratio of the copper cations to the non-ammonium thiosulfate is from up to 1:1 to 1:10000.

20. The method of claim 15 wherein the precious metal containing material contains a material selected from the group consisting of gold, platinum, palladium, silver, and combinations thereof.

21. The method of claim 15 wherein the precious metal containing material is precious metal containing ore, slurry, concentrate of precious metal containing ore, sized precious metal containing ore, tailings from concentrate or from other mineral processing.

22. The method of claim 15 wherein the precious metal containing material is a material prepared for heap leaching, agitation leaching, tank leaching, or column leaching.

23. The method of claim 15 wherein the thiosulfate component comprises a combination of magnesium thiosulfate and one or more of sodium thiosulfate, potassium thiosulfate, calcium thiosulfate.

24. The method of claim 1, wherein said alkaline pH is in the range of pH 9.0 to pH 11.

25. The method of claim 15, wherein said alkaline pH is in the range of pH 9.0 to pH 11.

26. The method of claim 15, wherein said ammonium hydroxide is present in said lixiviating solution at a concentration of from 0.005 M to 0.5 M.

27. A method for extracting precious metal from a material comprising:
   providing a precious metal containing material;
   providing a lixiviating solution comprising one or more thiosulfate components wherein at least one of said one or more thiosulfate components is ammonium thiosulfate;
   introducing one or more alkaline metal hydroxide or alkaline earth metal hydroxide compounds into the precious metal containing material, wherein at least one of said one or more hydroxides is a magnesium hydroxide in an amount forming during lixiviation a suspension comprising undissolved magnesium hydroxide and dissolved magnesium hydroxide;
   introducing the lixiviating solution into the precious metal containing material;
   lixiviating the precious metal containing material using said lixiviating solution to form a pregnant solution; and
   recovering the leached precious metal from the pregnant solution.

28. The method of claim 27 wherein the lixiviating solution further comprises copper cations.

29. The method of claim 27 wherein the stoichiometric ratio of copper cations to ammonium thiosulfate is between 1:10000 to 1:5.

30. The method of claim 27 wherein the copper cations are provided by water soluble copper salts.

31. The method of claim 27 wherein the ammonium thiosulfate component is present in the lixiviating solution in a concentration ranging from about 0.001 M to about 0.5 M.

32. The method of claim 27 wherein the thiosulfate component comprises a combination of two or more of sodium thiosulfate, potassium thiosulfate, magnesium thiosulfate, calcium thiosulfate, ammonium thiosulfate, wherein one of two or more thiosulfate component is ammonium thiosulfate.

33. The method of claim 27 wherein the magnesium hydroxide is introduced into the precious metal material in stoichiometric ratio of magnesium hydroxide to precious metal material of 1:10 to 1 to 10000.

34. The method of claim 27 wherein the precious metal containing material is a material prepared for heap leaching, agitation leaching, tank leaching, or column leaching.

35. The method of claim 27 wherein the precious metal containing material is a precious metal containing ore treated by a comminution process selected from the group consisting of crushing, grinding, and cutting.

36. The method of claim 27 wherein the precious metal containing material is a precious metal containing ore, sized precious metal containing ore, or slurry.

37. The method of claim 27 wherein the precious metal containing material contains a material selected from the group consisting of gold, platinum, palladium, silver, and combinations thereof.

38. The method of claim 37 wherein the material leached from the precious metal material is gold.

39. The method of claim 30 wherein the water soluble copper salts are selected from the group consisting of copper sulfate, copper nitrate, copper acetate, copper chloride, and combinations thereof.

* * * * *